(12) United States Patent
Bergman

(10) Patent No.: US 8,080,603 B2
(45) Date of Patent: Dec. 20, 2011

(54) LOW HYSTERESIS RUBBER ELASTOMER

(75) Inventor: Brian R. Bergman, Clermont-Ferrand (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 12/520,407

(22) PCT Filed: Dec. 20, 2006

(86) PCT No.: PCT/US2006/048530
§ 371 (c)(1),
(2), (4) Date: Jun. 19, 2009

(87) PCT Pub. No.: WO2008/079107
PCT Pub. Date: Jul. 3, 2008

(65) Prior Publication Data
US 2010/0056686 A1    Mar. 4, 2010

(51) Int. Cl.
*C08F 8/00* (2006.01)
*C08K 5/04* (2006.01)
*C08K 5/00* (2006.01)
*C08L 21/00* (2006.01)

(52) U.S. Cl. ........ 524/396; 524/394; 524/397; 524/400; 525/305; 525/88; 525/98; 525/99

(58) Field of Classification Search .................. 524/394, 524/396, 397, 400; 152/158; 525/305, 88, 525/98, 99
See application file for complete search history.

(56) References Cited

U.S. PATENT DOCUMENTS

| 4,720,526 A |  | 1/1988 | Roland |  |
|---|---|---|---|---|
| 5,310,811 A | * | 5/1994 | Cottman et al. | 525/305 |
| 5,506,308 A |  | 4/1996 | Ahmad et al. |  |
| 2003/0088023 A1 | * | 5/2003 | Motofusa et al. | 525/63 |
| 2004/0122134 A1 | * | 6/2004 | Weydert et al. | 524/47 |
| 2004/0144464 A1 | * | 7/2004 | Rhyne et al. | 152/158 |
| 2004/0187996 A1 |  | 9/2004 | Grah |  |
| 2004/0254301 A1 |  | 12/2004 | Tsukimawashi |  |
| 2004/0260038 A1 |  | 12/2004 | Choi |  |
| 2005/0176858 A1 | * | 8/2005 | Nohara et al. | 524/106 |
| 2007/0209744 A1 | * | 9/2007 | Matsumura | 152/510 |

FOREIGN PATENT DOCUMENTS

| JP | 60-262840 | 12/1985 |
|---|---|---|
| JP | 62-117572 | 5/1987 |
| WO | WO99/11700 | 3/1999 |

OTHER PUBLICATIONS

Henning et al., Fundamentals of curing elastomers with peroxide and coagents, Rubber World, p. 28-35, Feb. 2006.*
Henning, Steven K. And Shapot, Scott A.; "Multifunctional Acrylates as Anti-Reversion Agents in Sulfur Cured Systems," Sartomer Company, Inc., Exton, PA, presented at Fall 168th Technical Meeting of the Rubber Division, American Chemical Society, Nov. 1-3, 2005.
International Search Report, PCT/US06/048530, dated Nov. 16, 2007.

* cited by examiner

*Primary Examiner* — James J Seidleck
*Assistant Examiner* — Deve E Valdez
(74) *Attorney, Agent, or Firm* — Frank J. Campigotto; E. Martin Remick; Kurt J. Fugman

(57) ABSTRACT

Curable elastomer compositions and cured and/or curable articles made therefrom, the curable elastomer composition comprising an essentially unsaturated rubber elastomer, between 0.5 and 25 phr of a metal salt of a carboxylic acid, an effective amount of a peroxide curing agent for curing the elastomer composition and between 0.1 and 10. phr of a hysteresis-decreasing multifunctional curing coagent that decreases the hysteresis of the cured elastomer composition, wherein the hysteresis is measured using a rotorless shear rheometer as a loss tangent at 150° C., 41.85% strain and 10 Hz. The hysteresis of such a cured composition may decrease by at least 15% or alternatively, by at least 25%. The elastomer is useful in tires including, for example, the sidewall supports, the carcass reinforcement and the tread.

17 Claims, 1 Drawing Sheet

LOW HYSTERESIS RUBBER ELASTOMER

BACKGROUND OF THE INVENTION

1. Field of the Invention

This invention relates generally to elastomers and more specifically, to elastomers having natural or synthetic rubber that are useful for elastomeric articles, including tires.

2. Description of the Related Art

Rubber elastomers are often cured using either a sulfur curing system or a free radical cure system. Of the free radical curing systems, the systems that utilize organic peroxides as the free radical generator are the most common and well known. Peroxide curing systems initiate crosslinking via free radical mechanisms using the organic peroxide as the curing agent. Known advantages of peroxide curing systems include, for example, the ability to cause crosslinking in lower compression set, better chemical and oil resistance, less discoloration, and better color stability with less staining.

Coagents have been used in peroxide curing systems in order to ameliorate the disadvantages while capitalizing on the desirable characteristics of free radical curing systems. U.S. Pat. No. 5,310,811 discloses the use of a free radical curing system and compares the effect of coagents on the cured elastomers. The coagents studied included trimethylol propane trimethacrylate, zinc dimethacrylate (ZDMA) and hydroquinone dimethacrylate. The effects of these coagents added separately to elastomer compositions were studied.

U.S. Pat. No. 5,506,308 discloses the use of a peroxide curing system that uses a precure inhibitor as well as zinc dimethacrylate (ZDMA). The precure inhibitor protects against scorch or prevulcanization of the elastomer and the unsaturated carboxylic metal salt during compounding.

Because of the benefits of using peroxide curing systems, research has continued to discover additional coagents and/or additional uses for coagents and peroxides that can improve the curing and the physical properties of elastomers.

SUMMARY OF THE INVENTION

The present invention provides curable elastomer compositions and cured and/or curable articles made therefrom. In a particular embodiment of the present invention, a curable elastomer composition for curing into a cured elastomer composition is provided, the curable elastomer composition comprising an essentially unsaturated rubber elastomer, between 0.5 and 25 phr of a metal salt of a carboxylic acid, an effective amount of a peroxide curing agent for curing the elastomer composition and between 0.1 and 10 phr of a hysteresis-decreasing multifunctional curing coagent that decreases the hysteresis of the cured elastomer composition as compared to the composition without the multifunctional curing coagent, wherein the hysteresis is measured using a rotorless shear rheometer as a loss tangent at 150° C., 41.85% strain and 10 Hz. The hysteresis of such a cured composition may decrease by at least 15% or alternatively, by at least 25%.

Particular embodiments of the elastomer may include a multifunctional curing coagent selected from maleimides, acrylates, cyanurates, anhydrides or combinations thereof.

Other embodiments of the present invention include an article comprising a cured elastomer composition, the cured elastomer composition produced by curing the curable elastomer composition described above.

A particular embodiment of the present invention includes a tire, the tire comprising a cured elastomer composition produced by curing the curable elastomer composition described above. The tire may include a sidewall, the sidewall comprising a support member, the support member comprising the cured elastomer composition. The tire may include a carcass reinforcement member of the tire, the carcass reinforcement member comprising the cured elastomer composition. The tire may include a tread, the tread comprising the cured elastomer composition.

Particular embodiments of the present invention include a method for making a tire that includes the steps of mixing the curable elastomer composition described above, forming one or more tire components comprising the mixed curable elastomer composition and assembling the tire, the tire comprising the one or more tire components comprising the mixed elastomer composition.

Particular embodiments of the present invention also include a curable elastomer composition having an essentially unsaturated rubber elastomer, between 0.5 and 25 phr of a metal salt of a carboxylic acid, a free radical initiator curative for the rubber elastomer and between 0.1 and 10 phr of a hysteresis-decreasing multifunctional curing coagent that decreases the hysteresis of the cured elastomer composition, wherein the hysteresis is measured using a rotorless shear rheometer as a loss tangent at 150° C., 41.85% strain and 10 Hz.

Throughout the specification, including the claims, all amounts of components in a mixture are in parts by weight unless otherwise specified. Also, "phr" denotes parts by weight per 100 parts by weight of rubber and/or other elastomer in a composition comprising rubber and/or other elastomer.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

Figure 1:
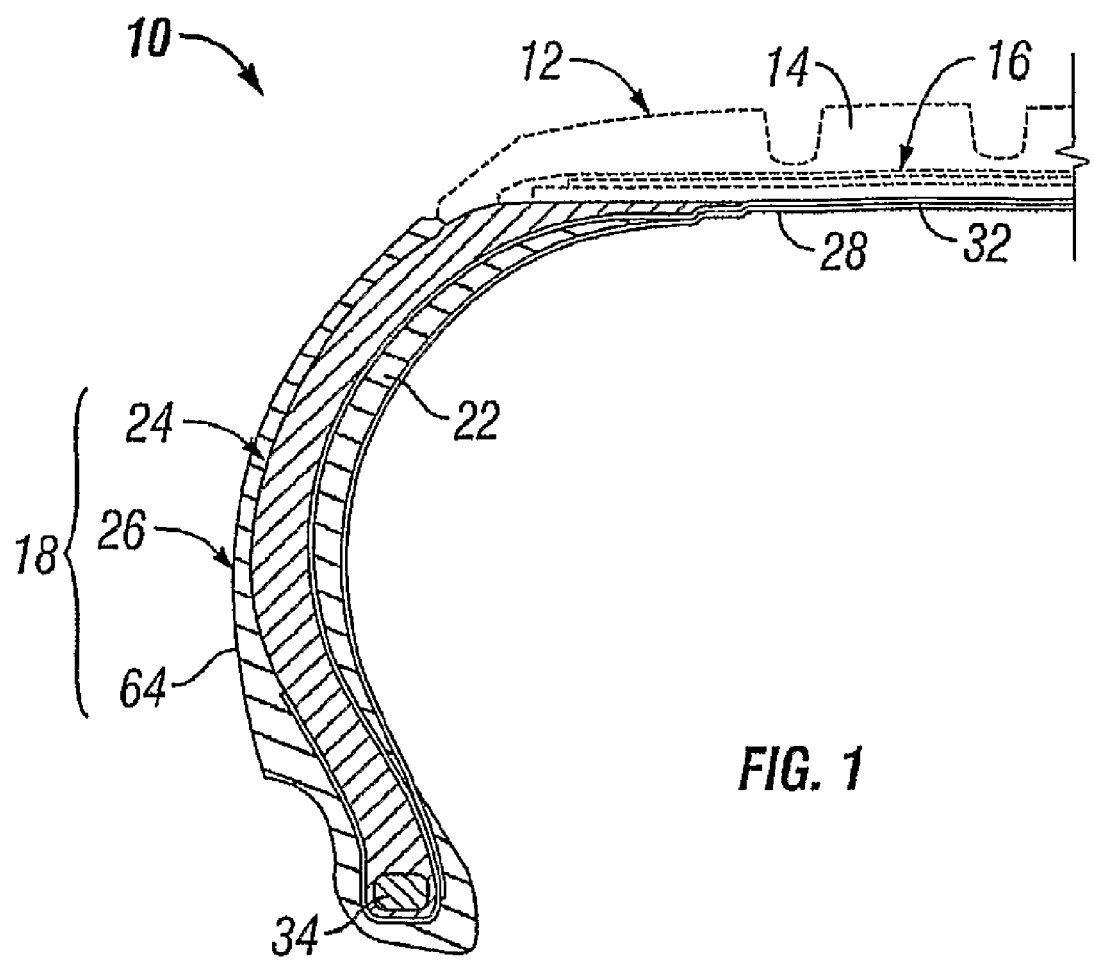
FIG. 1 is a cross-sectional view of one-half of a run-flat tire having a sidewall support in accordance with the present invention.

The present invention provides elastomer compositions and products made therefrom that surprisingly provide a combination of favorable rigidity, hysteresis and elongation properties. Particularly surprising is the reduced hysteresis of the cured elastomer compositions at temperatures well over ambient and especially over 120° C., recognizing that elastomers typically decompose between about 220° C. and 250° C. Elastomers having such properties are particularly suited for use in tires and especially for use in those parts of a tire that run at the highest elevated temperatures.

For purposes of the claimed invention, dynamic properties, including hysteresis measured as tangent delta, are measured using a rotorless shear rheometer such as the RPA 2000 manufactured by Alpha Technologies utilizing the ASTM D6601 Standard Test Method.

These properties are obtained by curing a rubber elastomer using a free radical initiator curative system with small amounts of a metal salt of a carboxylic acid and a multifunctional curing coagent. Surprisingly, the cured rubber elastomer is characterized as having a large favorable decrease in hysteresis at elevated temperatures with increased rigidity while the change in elongation properties remains relatively small when compared with an identical elastomer that lacks the multifunctional curing coagent. The decreased hysteresis is observed Particular embodiments of the present invention include curable elastomer compositions that when cured, provide cured elastomer compositions having the combination of favorable hysteresis, rigidity and elongation properties discussed above. Such uncured compositions include an essentially unsaturated rubber elastomer and between about 0.5 and 25 parts by weight per hundred parts by weight of the rubber elastomer (phr) of a metal salt of a carboxylic acid. Also included is a free radical initiator curative for the rubber elastomer and between 0.1 and 10 phr of a multifunctional curing coagent. Other embodiments may include the multifunctional curing coagent in an amount of between 0.2 and 9 phr, in an amount of between 0.5 and 6 phr, or in an amount of between 0.5 and 4 phr.

The rubber elastomers that are useful for particular embodiments of the present invention include natural rubbers, synthetic rubbers or combinations thereof that are curable with a metal salt of a carboxylic acid and a peroxide cure system or other free radical initiator curing system.

Particular embodiments of the present invention include rubber elastomers that are essentially unsaturated diene elastomers. Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %.

Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type do not fall within the preceding definition, and may in particular be described as "essentially saturated" diene elastomers (low or very low content of units of diene origin, i.e., less than 15 mol. %).

Within the category of essentially unsaturated diene elastomers, highly unsaturated diene elastomer is understood to mean in particular a diene elastomer having a content of units of diene origin (conjugated dienes) that is greater than 50 mol. %.

The rubber elastomers suitable for use with particular embodiments of the present invention include highly unsaturated diene elastomers, for example, polybutadienes (BR), polyisoprenes (IR), natural rubber (NR), butadiene copolymers, isoprene copolymers and mixtures of these elastomers.

Also suitable for use in particular embodiments of the present invention are rubber elastomers that are copolymers and include, for example, butadiene-styrene copolymers (SBR), butadiene-isoprene copolymers (BIR), isoprene-styrene copolymers (SIR) and isoprene-butadiene-styrene copolymers (SBIR) and mixtures thereof.

Also suitable for use in particular embodiments of the present invention are rubber elastomers that that include, for example, natural rubber, synthetic cis-1,4 polyisoprenes and mixtures thereof. These synthetic cis-1,4 polyisoprenes may be characterized as possessing cis-1,4 bonds at more than 90 mol. % or alternatively, at more than 98 mol. %.

As noted above, particular embodiments of the present invention include the rubber elastomers disclosed above that are curable with a metal salt of a carboxylic acid and a peroxide cure system. Particular embodiments of the present invention include an organic peroxide as part of the peroxide curing system, examples of which include di-cumyl peroxide; tert-butyl cumyl peroxide; 2,5-dimethyl-2,5 bis(tertbutyl peroxy)hexyne-3; bis(tert-butyl peroxy isopropyl)benzene; 4,4-di-tert-butyl peroxy N-butyl valerate; 1,1-di-tert-butylperoxy-3,3,5-trimethylcyclohexane; bis-(tert-butyl peroxy)-diisopropyl benzene; t-butyl perbenzoate; di-tert-butyl peroxide; 2,5-dimethyl-2,5-di-tert-butylperoxide hexane, as well as other peroxides known to those having ordinary skill in the art and combinations thereof.

The amount of peroxide curing agents useful in particular embodiments of the presenting invention depends, as known to one having ordinary skill in the art, upon the elastomer and coagent loading utilized. In general, such amounts of peroxide curing agents may range between about 0.1 parts per hundred weight of elastomer (phr) and about 10 phr. Particular embodiments may utilize the peroxide at between about 0.1 phr and about 5 phr or alternatively, between about 0.5 and 3 phr of a product having 40% active peroxide.

Other free radical generating compounds and mechanisms may also be employed in particular embodiments in lieu of the organic peroxide. Examples of such include ultra-violet light, beta and gamma radiation, azo compounds such as 2',2'-azobisisobutyronitrile, 2,2'-azobis(2,4-dimethylpentanenitrile), 1,1'-azobis(cyclohexanecarbonitrile), disulfides and tetrazenes. These compounds and mechanisms as well as their use as rubber elastomer curative systems are well known to those having ordinary skill in the art.

Particular embodiments of the present invention further include a curing coagent that is a metal salt of a carboxylic acid, particularly of an unsaturated carboxylic acid. Typically, coagents that are useful in free radical initiator curing systems, such as peroxide curing systems, are low molecular weight compounds that improve processability and/or enhance the physical properties of peroxide-cured elastomers.

In particular embodiments of the invention, carboxylic acids useful for making the coagent metal salt include, for example, methacrylic acid, ethacrylic acid, acrylic acid, cinnamic acid, crotonic acid, maleic acid, fumaric acid, itaconic acid, and mixtures thereof. Particular embodiments of the present invention may find acrylic acid and methacrylic acid particularly useful.

The metal used to form the metal salt with the carboxylic acid may include, for example, sodium, potassium, iron, magnesium, calcium, zinc, barium, aluminum, tin, zirconium, lithium, cadmium, and cobalt and combinations thereof. Particular embodiments may find zinc and/or magnesium to be particularly useful.

Particular embodiments of the present invention utilize a metal salt selected from, for example, zinc dimethacrylate (ZDMA), zinc diacrylate, magnesium dimethacrylate, magnesium diacrylate or combinations thereof. Other suitable acrylates as known to those having ordinary skill in the art may be used alone or in combination with other acrylates.

Particular embodiments of the present invention include the use of the metal salt in an amount between about 0.5 and about 50 phr. In other embodiments, the amount of metal salt used in the composition may range from between about 0.5 and 25 phr or alternatively, between about 0.5 and about 15 phr or between 0.5 and less than 10 phr. Other embodiments include an amount of metal salt of between 0.5 and less than 5 phr.

Particular embodiments of the present invention further include a multifunctional curing coagent that is included in the curable elastomer composition. It is this coagent combined with the metal salt of a carboxylic acid that provides the cured rubber elastomer having the surprising favorable mix of rigidity, hysteresis and elongation properties including the surprising significant decrease in hysteresis at elevated temperatures. Particular embodiments of the present invention include as the multifunctional curing coagent a bifunctional curing coagent.

Furthermore, surprisingly only relatively small quantities of the multifunctional curing coagent must be added to the curable composition to obtain the surprising result. Particular embodiments of the present invention include an amount of the multifunctional curing coagent at quantities between 0.1 and 10 phr or alternatively, between 0.25 and 7 phr. Particular embodiments of the present invention further include an amount of the multifunctional curing coagent of between 0.25 and 5 phr.

The multifunctional curing coagents useful in the present invention include any of the multifunctional curing coagents that, when combined in curable elastomer compositions in effective amounts with a metal salt of a carboxylic acid and a free radical curing system, provide the improved hysteresis at temperatures above 120° C. of the cured elastomers. Examples of multifunctional curing agents include maleimides, acrylates, cyanurates, anhydrides and combinations thereof. Examples of anhydrides include maleic anhydride, succinic anhydride and combinations thereof.

Examples of maleimides include n,n'-m-phenylene dimaleimide and 1,3-Bis(citraconimidomethyl)benzene. Examples of mono-acrylates include octyl/decyl acrylate, 3-chloro-2-hydroxypropyl methacryulate, oligoester acrylate(s) and combinations thereof.

Examples of di-acrylates include 1,6-hexanediol diacrylate, diethylene glycol diacrylate, diethylene glycol dimethacrylate, 1,6-hexanediol dimethylacrylate, 1,6-hexanediol diacrylate, polybutadiene diacrylate, 1,3, butylene dimethacrylate, 1,4, butylene dimethacrylate, polyethylene glycol dimethacrylate, 1,4 butanediol diacrylate, 2,2'bis(4-methacryloxydiethoxyphenyl)propane, 2,2'bis(4-acryloxydiethoxyphenyl) propane, 1,4 benzene diacrylate, 1,4 benzene dimethacrylate, 1,3.benzene diacrylate, 1,3.benzene dimethacrylate, 1,4.benzene diacrylate, 1,4-benzene dimethacrylate, 1,2.benzene diacrylate, 1,2.benzene dimethacrylate, 1,2-naphthalene diacrylate, 1,2-naphthalene dimethacrylate, 1,3-naphthalene diacrylate, 1,3-naphthalene dimethacrylate, 1,4-naphthalene diacrylate, 1,4-naphthalene dimethacrylate, 1,5-naphthalene diacrylate, 1,5-naphthalene dimethacrylate, 1,6-naphthalene diacrylate, 1,6-naphthalene dimethacrylate, 1,7-naphthalene diacrylate, 1,7-naphthalene dimethacrylate, 1,8-naphthalene diacrylate, 1,8-naphthalene dimethacrylate, 2,3-naphthalene diacrylate, 2,3-naphthalene dimethacrylate, 2,6-naphthalene diacrylate, 2,6.naphthalene dimethacrylate, 2,7-naphthalene diacrylate, 2,7-naphthalene dimethacrylate, and combinations thereof.

Examples of tri-acrylates include trimethylolpropane triacrylate, trimethylolpropane trimethacrylate, trimethylolpropane triacrylate, pentaerythritol triacrylate, 1,3,5-benzene triacrylate, 1,3,5-benzene trimethacrylate, 1,2,3-benzene triacrylate, 1,2,3-benzene trimethacrylate, 1,2,4-benzene triacrylate, 1,2,4-benzene trimethacrylate, 1-hydroxybenzene-3,5-diacrylate, 1-hydroxybenzene 3,5-dimethacrylate, 1hydroxybenzene-2,3-diacrylate, 1-hydroxybenzene-2,3-dimethacrylate, 1-hydroxybenzene2,4-diacrylate, 1-hydroxybenzene 2,4-dimethacrylate, 1,3,5naphthalene triacrylate and its isomers, 1,3,5-naphthalene trimethacrylate and its isomers, 1-hydroxy naphthalene-3,5-diacrylate and its isomers, 1-hydroxy naphthalene-3,5-dimethacrylate and its isomers and combinations thereof.

Other useful multifunctional curing agents include tetraacrylates such as pentaerythritol tetraacrylate; penta-acrylates such as dipentanerythritol pentaacrylate; and cyanurates such as triallyl cyanurate and triallyl isocyanurate.

Particular embodiments of the present include multifunctional curing coagents such as, for example, 1,3-Bis(citraconimidomethyl)benzene (known as DP900 and available as PERKALINK 900 from Flexsys, Inc. of Alcron, Ohio), N,N'-m-phenylenedimaleimide (Bis-maleimide), BMI (1,2-phenylene dimaleimide), BMI (1,4-phenylene dimaleimide) and combinations thereof, maleic anhydride, succinic anhydride and acrylate esters. An example of a suitable acrylate ester is a blend of multifunctional acrylate esters available as SR354, a product of Sartomer Company, Inc. of Pennsylvania.

Particular embodiments of the present invention may further include within an unicured rubber elastomer composition other components such as, for example, reinforcing fillers, coupling agents, plasticizers, antiozonants, resins, various processing aids, oil extenders, antidegradents, antioxidants or combinations thereof as known to those having ordinary skill in the art. Suitable fillers include carbon black as well as inorganic fillers ("white fillers") such as silica, alumina, aluminum hydroxide, clays, calcium carbonate, glass fibers, microspheres, polymeric fibers such as polyester, nylon, or aramid fibers. Selection of these materials and quantities of these materials to use are dependent on the elastomers used and the final application of the rubber elastomer composition and are easily selected by one having ordinary skill in the art.

The elastomer compositions disclosed herein may be used for various elastomeric products such as a tread compound, undertread compound, sidewall compound, wire skim compound, inner liner compound, bead, apex, any compound used in a tire carcass, including carcass reinforcement and in other components for tires, industrial rubber products, seals, timing belts, power transmission belting, and other rubber goods. As such, the present invention includes products made from the rubber elastomer compositions disclosed herein.

The elastomer composition of the present invention is particularly suited for use in tires that are intended to bear heavy loads including, for example, truck tires and tires for heavy vehicles. Such tires typically comprise reinforcements which are formed of reinforcing threads or plies of metal wires coated with elastomers. More precisely, these tires comprise, in their bottom zone, one or more bead wires, a carcass reinforcement extending from one bead wire to the other and, in their crown, a crown reinforcement comprising at least two crown plies. Such structures and tire architecture are well known to one having ordinary skill in the art and therefore, a detailed disclosure of such information is neither required nor proper.

When running under heavy load, the "band" of the carcass (central zone on either side of the median circumferential plane of the tire) is subjected to flexural stresses that may be very high; hence the necessity of imparting a high mechanical strength to this "band". Likewise, the bottom zone of the tire (close to each of the two upturns of the carcass) may be in a zone of operating temperatures that are very high; hence the necessity of imparting reduced hysteresis to this bottom zone. Particular embodiments of the elastomer composition of the present invention are particularly suited for use in the materials that comprise these and other reinforcements within the tire.

Particular embodiments of the elastomer composition of the present invention are also particularly useful as an undertread or tread material of a tire, especially for those tires that are intended to bear a heavy load. For example, an undertread of a tire may be formed of particular embodiments of the elastomer composition to provide a tire having improved rolling resistance and durability. The improved rolling resistance and durability of the tire is achieved due to the physical characteristics of the elastomeric composition that provide the surprisingly favorable mix of rigidity, hysteresis and elongation properties as well as the surprising decrease in hysteresis at elevated temperatures.

Particular embodiments of the present invention further include sidewall supports for vehicle tires, especially for those tires that are suitable for run-flat operation. The physical characteristics of the elastomer composition disclosed herein provide the benefits that are sought in run-flat tire applications. Because a run-flat tire must operate over a significant distance in a non-inflated state while still providing support for a vehicle, rigidity and hysteresis properties of the materials making up the sidewall are critical. As known to those having ordinary skill in the art, run-flat tires are designed to operate for a suitable distance after loss of normal inflation pressure. Rigidity is desired to provide the needed support for the vehicle or load on the tire and low hysteresis is desired to minimize heat buildup in the tire during run-flat operation. A sidewall support comprising the elastomer composition of the present invention provides the surprisingly good mix of rigidity, hysteresis elongation properties.

The supports are made a part of the sidewall by tire building methods known to those having ordinary skill in the art and the known steps that are a part of such methods or processes are not a part of the present invention.

FIG. 1 is a cross-sectional view of one-half of a run-flat tire having a sidewall support in accordance with the present invention. It should be noted that the tire shown herein is exemplary only and is not meant to limit the invention to run-flat tires having only the architecture shown here. The run-flat tire 10 includes a crown portion 12 with a tread 14 and a tread reinforcing package 16. The run-flat tire 10 further includes a sidewall 18 having a crescent shaped reinforcing member 22 with a supportive complex 24 and a protective complex 26. An inner liner 28 and tire carcass 32 wrapped around a bead core 34 are also included as typical in a pneumatic vehicle tire.

The present invention further includes methods for making tires and other products having the elastomer composition in accordance with the present invention. One method includes the steps of mixing the elastomer composition comprising the rubber elastomer, the metal salt of a carboxylic acid, the organic peroxide curative system and the multifunctional curative coagent. The quantities of these materials that are mixed are fully disclosed above. The method further includes forming one or more tire components comprising the mixed elastomer composition and then assembling the tire that comprises the one or more tire components comprising the mixed elastomer composition. Particular embodiments of the present invention further include curing the tire. Examples of the one or more components include, for example, sidewall support members, tread, undertread, carcass, carcass reinforcement and combinations thereof.

The present invention does not include the known steps of the method for assembling a tire or for curing a tire. One having ordinary skill in the art is knowledgeable of such methods or processes and therefore, a detailed disclosure of such information is neither required nor proper.

The invention is further illustrated by the following examples, which are to be regarded only as illustrations and not delimitative of the invention in any way. The properties of the compositions disclosed in the examples were evaluated as described below.

Moduli of elongation (MPa) were measured at 10%, 50% and at 100% at a temperature of 23° C. in accordance with ASTM Standard D412 on ASTM C test pieces. These measurements are true secant moduli in MPa, that is to say the secant moduli calculated reduced to the real cross-section of the test piece at the given elongation.

Hysteresis losses (HL) were measured in percent by rebound at 60° C. at the sixth impact in accordance with the following equation:

$$HL(\%) = 100(W_0 - W_1)/W_1,$$

where $W_0$ is the energy supplied and $W_1$ is the energy restored.

The elongation property was measured as elongation at break (%) and the corresponding elongation stress (MPa), which is measured at 23° C. in accordance with ASTM Standard D412 on ASTM C test pieces.

The dynamic characteristics of the materials were measured on a rotorless shear rheometer and more specifically, on an RPA 2000 rheometer manufactured by Alpha Technologies. For the examples provided below, the samples were cured in the RPA 2000 at 170° C. for 15 minutes at a frequency of 1.67 Hz and 0.05 deg arc. A strain sweep was then performed at 150° C. at a frequency of 10 Hz. The data was reported at a strain value of 41.85%, which is equivalent to 3 degree angle of oscillation.

Example 1

Elastomer formulations were prepared using the components shown in Table 1 and using procedures well known to one having ordinary skill in the art. The amount of each component making up the elastomer formulations shown in Table 1 are provided in parts per hundred weight (phr) of the elastomer. Other components included in Table 1 were TMQ antioxidant and Zn stearate, at 1 phr each, which are compounds known to those having ordinary skill in the art.

The elastomer formulations were prepared by mixing the components given in Table 1, except for the peroxide, in a banbury mixer operating at 55-65 RPM until a temperature of between 155 and 170° C. was reached. The peroxide was then added on a roll mill. Vulcanization was effected at 150° C. for 60 minutes. The formulations were then tested to measure their physical properties.

TABLE 1

| Physical Properties of Elastomers Having Bifunctional Reactant (Normalized) | | | | | | |
|---|---|---|---|---|---|---|
| | E1 | E2 | E3 | E4 | E5 | E6 |
| Elastomer Composition | | | | | | |
| Elastomer (NR/PB) | 35/65 | 35/65 | 35/65 | 35/65 | 35/65 | 35/65 |
| ZDMA (PRO5642) | 7.5 | 7.5 | 7.5 | 7.5 | 7.5 | 7.5 |
| Carbon Black (N650) | 50 | 50 | 50 | 50 | 50 | 50 |
| Peroxide (DI-CUP 40C) | 2.5 | 3 | 2.5 | 2.5 | 2.5 | 2.5 |

TABLE 1-continued

Physical Properties of Elastomers Having Bifunctional Reactant (Normalized)

|  | E1 | E2 | E3 | E4 | E5 | E6 |
|---|---|---|---|---|---|---|
| Acrylate Ester (SR534) |  |  | 2 | 4 |  |  |
| 1,3-Bis(citraconimidometyl)benzene |  |  |  |  | 1 | 2 |
| TMQ Antioxidant & Zn Stearate | 2 | 2 | 2 | 2 | 2 | 2 |
| Measured Properties |  |  |  |  |  |  |
| Hysteresis @ 60° C. | 100 | 87.2 | 90.7 | 93.1 | 91.0 | 90.0 |
| % Δ | 0.0% | −12.8% | −9.3% | −6.9% | −9.0% | −10.0% |
| Modulus 10% @ 23° C. (MPa) | 100 | 115.2 | 113.5 | 130.5 | 110.2 | 116.9 |
| Modulus 50% @ 23° C. (MPa) | 100 | 117.3 | 118.1 | 144.4 | 111.4 | 121.6 |
| % Δ | 0.0% | 17.5% | 18.1% | 44.6% | 11.4% | 21.6% |
| Modulus 100% @ 23° C. (MPa) | 100 | 123.4 | 129.2 | 170.8 | 123.6 | 131.6 |
| Elongation Stress (MPa) | 100 | 102.7 | 99.5 | 95.1 | 99.5 | 106.6 |
| Elongation Strain (%) | 100 | 84.8 | 87.1 | 83.0 | 96.4 | 95.5 |
| % Δ | 0.0% | −15.2% | −13.2% | −17.0% | −3.8% | −4.7% |
| G' @ 40% (150° C.) | 100 | 116.7 | 118.2 | 137.3 | 113.9 | 120.6 |
| % Δ | 0.0% | 17.0% | 18.4% | 37.5% | 14.0% | 20.9% |
| Tan δ @ 40% (150° C.) | 100 | 86.9 | 57.1 | 53.6 | 64.3 | 54.8 |
| % Δ | 0.0% | −13.1% | −42.9% | −46.4% | −35.7% | −45.2% |
| G' @ 40% (200° C.) | 100 | 115.8 | 130.6 | — | 120.9 | 131.6 |
| % Δ | 0.0% | 15.8% | 30.8% | — | 20.9% | 31.8% |
| Tan δ @ 40% (200° C.) | 100 | 93.6 | 20.8 | — | 56.0 | 40.0 |
| % Δ | 0.0% | −6.4% | −79.2% | — | −44.0% | −60.0% |

The rubber elastomer formulations E1-E6 were made up of a 35/65 blend of natural rubber (NR) and polybutadiene rubber (PB). All the components shown in Table 1 were The ZDMA in the formulations was PRO5642 (75% ZDMA in PB) available from Sartomer Company, Inc. of Exton, Pa. The peroxide currant was dicumyl peroxide available as DI-CUP 40C (40 wt. % active peroxide) from GEO Specialty Chemicals of Gibbstown, N.J. Two different multifunctional curing coagents were used separately in the formulations. One of the multifunctional curing coagents used in formulation E5 and E6 was 1,3 Bis(citraconimidomethyl)benzene, also known as DP900, which was available as PERKALINK 900 from Flexsys of Akron, Ohio. The second multifunctional curing coagent was a blend of multifunctional acrylate esters, available as SR534 from Sartomer Company, Inc. of Exton, Pa.

The test results show the surprising decrease in hysteresis in formulations E3-E6 with the small amount of multifunctional curing coagent over formulations E1 that did not have the curing coagent. The Tan δ is shown to decrease at 150° C. by 36-46% and to decrease at 200° C. by 44-79%!

The elastomer composition E2 further illustrates the surprising results that are achieved by the elastomer compositions of E3-E6. The elastomer composition E2 utilized additional peroxide to obtain modulus increases similar to those of elastomer compositions E3, E5 and E6. As seen from the properties of the elastomer composition E2, the modulus and hysteresis at 60° C. was achieved with the additional peroxide. However, to illustrate the surprising result of the multifunctional curing agent, the high temperature hysteresis of the elastomers is dramatically lower in the elastomeric compositions having the multifunctional curing agent (E3-E6) than the hysteresis of the composition having only the increased peroxide (E2).

It should be noted that the improved hysteresis of the rubber compositions having the metal salt and the multifunctional curing agent can lead to improved performance of tires that include such compositions in those parts of the tire that run at higher temperature and especially, in tires designed for run-flat performance.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A curable elastomer composition for curing into a cured elastomer composition, the curable elastomer composition comprising:
  an essentially unsaturated rubber elastomer;
  between 0.5 and 25 parts by weight per hundred parts by weight of the rubber elastomer (phr) of a metal salt of a carboxylic acid;
  an effective amount of a peroxide curing agent for curing the elastomer composition; and
  between 0.1 and 10 phr of an anhydride multifunctional curing coagent that decreases the hysteresis of the cured elastomer composition as compared to the cured elastomer composition lacking the multifunctional curing coagent, wherein the hysteresis is measured using a rotorless shear rheometer as a loss tangent at 150° C., 41.85% strain and 10 Hz.

2. The composition of claim 1, wherein the hysteresis decreases by at least 15%.

3. The composition of claim 1, comprising:
between 0.5 and 10 phr of the metal salt of the carboxylic acid.

4. The composition of claim 1, wherein the carboxylic acid is selected from methacrylic acid, ethacrylic acid, acrylic acid, cinnamic acid, crotonic acid, maleic acid, fumaric acid, itaconic acid, or mixtures thereof.

5. The composition of claim 1, wherein the metal used to form the metal salt with the carboxylic acid is selected from sodium, potassium, iron, magnesium, calcium, zinc, barium, aluminum, tin, zirconium, lithium, cadmium, and cobalt or combinations thereof.

6. The composition of claim 1, wherein the metal salt is zinc dimethacrylate, zinc diacrylate or combinations thereof.

7. The composition of claim 1, wherein the metal salt is magnesium dimethacrylate, magnesium diacrylate or combinations thereof.

8. The composition of claim 1, wherein the rubber elastomer is selected from polybutadienes, polyisoprenes, natural rubber, butadiene copolyniers, isoprene copolymers or mixtures thereof.

9. The composition of claim 1, wherein the rubber elastomer is selected from butadiene-styrene copolymers, butadiene-isoprene copolymers, isoprene-styrene copolymers and isoprene-butadiene-styrene copolymers.

10. The composition of claim 1, wherein the anhydride multifunctional curing coagent is selected from maleic anhydride, succinic anhydride or combinations thereof.

11. An article, comprising:
a cured elastomer composition, the cured elastomer composition produced by curing the curable elastomer composition of claim 1.

12. The article of claim 11, comprising:
the cured elastomer composition produced by curing the curable elastomer composition of claim 2.

13. The article of claim 11, wherein the curable rubber composition comprises a rubber elastomer selected from polybutadienes, polyisoprenes, natural rubber, butadiene copolymers, isoprene copolymers or mixtures thereof.

14. The article of claim 11, wherein the curable rubber composition comprises a rubber elastomer selected from butadiene-styrene copolymers, butadiene-isoprene copolymers, isoprene-styrene copolymers and isoprene-butadiene-styrene copolymers.

15. The article of claim 11, wherein the curable rubber composition comprises the anhydride multifunctional curing coagent selected from maleic anhydride, succinic anhydride or combinations thereof.

16. The article of claim 11, wherein the article is a tire component.

17. The article of claim 11, wherein the tire component is a sidewall

* * * * *